United States Patent [19]

Fukumura

[11] 3,770,585

[45] Nov. 6, 1973

[54] PROCESS FOR PREPARING L-LYSINE

[75] Inventor: Takashi Fukumura, Kamakura, Japan

[73] Assignee: Toray Industries, Inc., Tokyo, Japan

[22] Filed: Nov. 10, 1971

[21] Appl. No.: 197,487

[30] Foreign Application Priority Data
Nov. 19, 1970 Japan.............................. 45/101472

[52] U.S. Cl. ................................................. 195/29
[51] Int. Cl............................................ C12d 13/06

[58] Field of Search ....................................... 195/29

[56] References Cited
UNITED STATES PATENTS
3,056,729  10/1962  Seto..................................... 195/29

Primary Examiner—Alvin E. Tanenholtz
Attorney—Austin R. Miller et al.

[57] ABSTRACT

L-Lysine is prepared by biochemical asymmetrical hydrolysis of $\alpha$-amino-$\epsilon$-caprolactam.

4 Claims, No Drawings

PROCESS FOR PREPARING L-LYSINE

DESCRIPTION OF THE PRIOR ART

L-Lysine is a wellknown essential amino acid. It is known that L-lysine is produced by hydrolysis of α-amino-ε-caprolactam. (Helv. Chim. Acta, XLI, P 186 [1958]).

In respect to microbiological means a process is described by Seto et al. in U.S. Pat. No. 3,056,729. But the rate of conversion of DL-α-amino-ε-caprolactam to L-lysine in the process is at most 30 percent.

SUMMARY OF THE INVENTION

This invention relates to a new and useful method for preparing L-lysine quantitatively from L-α-amino-ε-caprolactam in substantially pure form, i.e., free of any contamination with the D-lysine.

DESCRIPTION OF THE PREFERRED EMBODIMENTS

In accordance with this invention, the hydrolyzing activity of the microorganisms belonging to *Cryptococcus*, *Candida*, *Trichosporon* and the enzyme produced by said microorganisms brings about the conversion of L-α-amino-ε-caprolactam to L-lysine via a selective hydrolytic step, whereby the desired product is readily obtained in substantially pure form and quantitatively. In other words, in accordance with the process of this invention, L-αamino-ε-caprolactam gives pure L-lysine and DL-α-amino-ε-caprolactam gives pure L-lysine and D-α-amino-ε-caprolactam. (Hereinafter α-amino-ε-caprolactam is referred to as "aminolactam").

It has been found that L-amino-lactam is converted to L-lysine when incubated in contact with a cell suspension of any one of several yeast strains isolated from soil. Subsequently, several strains of *Cryptococcus laurentii*, *Candida humicola* and *Trichosporon cutaneum* from IFO were also found to possess the L-aminolactam hydrolyzing activity.

The L-amino-lactam hydrolyzing activity was also manifested in a growing culture, a culture broth, treated (or artificially modified) cells, such as vacuum-dried cells, lyophilized cells and acetone-dried cells, a cell extract, and an enzyme, namely L-amino-lactam amidohydrolase.

The yeast strain which is employed in the present invention can be chosen from the strains of the genera to which the yeast samples given the FERM-P. 709, 710, 712, 714, 715, 717, 719, 725, IFO 0753 (ATCC 9949) and IFO 0760, 0173, 1198, 0609, 0906 are taxonomically belong. ("FERM-P" is a Deposit number in the Fermentation Research Institute in Japan.)

According to our classification, strains of FERM-P 709 and 710 were found to be *Cryptococcus laurentii*, strains of FERM-P 715, 717 and 719 were *Candida humicola*, and strains of FERM-P 712, 714 and 725 were *Trichosporon cutaneum*.

In Table I characteristics of the FERM-P 709, 710 and *Cryptococcus laurentii* IFO 0609, 0906 are presented.

TABLE 1

| Specific name | Cryptococcus laurentii IFO 0609 | Cryptococcus laurentii IFO 0906 | FERM P709, Cryptococcus laurentii TORAY 2001 | FERM P710, Cryptococcus laurentii TORAY 2002 |
|---|---|---|---|---|
| I. Microscopic observations (1) Cells in YM broth 1. Shape | round, oval, long oval, elongate | | round, oval, long oval | |
| 2. Dominant cells | oval, (4–5) × (8–9) μ | | round to oval, (2.5–4) × (3–5) μ | |
| 3. Vegetative reproduction. | multilateral budding | | | |
| (2) Slide culture on potato-agar. | cells present. True mycelium, pseudomycelium, blastospores, chlamydospores, arthrospores are not observed. | | | |
| (3) Ascospore formation | not observed on a gypsum block or a modified Gorodkowa-agar in 30 days incubation. | | | |
| II. Cultural characteristics (1) YM broth 1. Turbidity | not turbid | | | |
| 2. Sediment | compact | | | |
| 4. Pellicle | creeping | | occasionally creeping | |
| 4. Ring | absent | | occasionally very weak ring | |
| (2) YM-agar colonies 1. Shape | circular | | | |
| 2. Margin | entire | | | |
| 3. Elevation | convex | | | |
| 4. Surface | smooth, dull | | smooth, glistening | |
| 5. Quality | butyrous | | mucous | |
| 6. Color | light reddish yellow | | light cream-colored | |
| III. Physiological characteristics (1) Sugar fermentation | no gas produced from glucose, galactose, sucrose, maltose, lactose, and raffinose in 30 days incubation. | | | |

TABLE 1—Continued

| Specific name | Cryptococcus laurentii IFO 0609 | Cryptococcus laurentii IFO 0906 | FERM P709, Cryptococcus laurentii TORAY 2001 | FERM P710, Cryptococcus laurentii TORAY 2002 |
|---|---|---|---|---|
| (2) Sugar assimilation (auxanographic method) | glucose, galactose, sucrose, maltose, lactose and raffinose are assimilated. | | | |
| (3) KNO$_3$ assimilation | absent (both on liquid culture and auxanographic method) | | | |
| (4) Litmus milk 1. Color | slightly acid, after 29 days reduced | | | |
| 2. Coagulation | coagulated after 26 days | | | |
| 3. Peptonization | no | | | |
| (5) Splitting of arbutin | positive (strong) | | | |
| (6) Starch-like compound | positive (violet reaction by lugol solution) | | positive (blue reaction by lugol solution) | |
| (7) L-Lysine utilization | utilized as carbon and nitrogen sources | | | |
| (8) L-Aminolactam utilization | utilized as carbon and nitrogen sources | | | |
| (9) Growth conditions | good growth at 30° C good growth at pH 6.0 | | | |
| IV. Source | | | isolated from soil | |

It is satisfactory to consider the two strains of FERM-P 709, 710 as *Cryptococcus*, and more particularly *Cryptococcus laurentii* on the basis of the description in J. Lodder and N. J. W. Kreger — Van Rij's "The Yeasts, A Taxonomic Study" (1967) and the close resemblance to *Cryptococcus laurentii* IFO 0609, IFO 0906.

In Table 2 characteristics of the FERM-P 715, 717, 719 and *Candida humicola* IFO 0753 (=ATCC 9949) are presented.

TABLE 2

| Specific name | ATCC 9949, Candida humicola IFO 0753 | FERM-P717, Candida humicola Toray 2010 | FERM-P715, Candida humicola Toray 2008 | FERM-P719, Candida humicola Toray 2020 |
|---|---|---|---|---|
| I. Microscopic observations (1) Cells in YM broth 1. Shape | variable shape: round, lemon-shaped, oval, elliptical, elongate, cylindrical. | | | |
| 2. Dominant cells | round to oval, (3–4) × 7μ | round to oval, (5–6)×(5–9)μ | elliptical, (4–5) × (7–10) μ | |
| 3. Vegetative reproduction. | multilateral budding | | | |
| (2) Slide culture on potato-agar. 1. Cells | present | | | |
| 2. True mycelium | present | | | development |
| 3. Pseudomycelium | rich development | | | |
| 4. Blastospores | development | | | |
| 5. Chlamydospores | not observed | | | present |
| 6. Arth spores | absent | | | |
| (3) Ascospore formation | not observed on a gypsum block or a modified Gorodkowa-agar in 30 days incubation. | | | |
| II. Cultural characteristics (1) YM broth 1. Turbidity | not turbid | | | |
| 2. Sediment | compact | | | flocculent |
| 3. Pellicle | islets to thin pellicle | | no formation | |
| 4. Ring | clear ring | | obscure ring | |
| (2) YM-agar colonies 1. Shape | circular, becoming filamentous | | | |
| 2. Margin | entire, becoming filamentous | | | |

TABLE 2.—Continued

| Specific name | ATCC 9949, Candida humicola IFO 0753 | FERM-P717, Candida humicola Toray 2010 | FERM-P715, Candida humicola Toray 2008 | FERM-P719, Candida humicola Toray 2020 |
|---|---|---|---|---|
| 3. Elevation | convex, at times umbonate | convex | slightly umbonate | convex, later umbonate |
| 4. Quality | butyrous, latter mucoid | butyrous | | |
| 5. Color | yellowish | light cream-colored | | |
| (3) YM slant culture 1. Growth | abundant | abundant | moderate | abundant |
| 2. Margin | filamentous | entire | undulate | filamentous |
| 3. Surface | wrinkled, lusterless | smooth, dull | rough, dull | rough and wrinkled, dull |
| III. Physiological characteristics (1) Sugar fermentation | no gas produced from glucose, galactose, sucrose, maltose, lactose and raffinose in 30 days incubation. | | | |
| (2) Sugar assimilation (auxanographic method) | glucose, galactose, sucrose, maltose, lactose are assimilated | | | |
| (3) KNO₃ assimilation | absent (both on liquid culture and auxanographic methods). | | | |
| (4) Litmus milk 1. Color | slightly red, later reduced | unchanged, after 22 days reduced | | |
| 2. Coagulation | coagulated | coagulated after 25 days | | |
| 3. Peptonization | slow peptonization of the coagulation. | after 30 days slow peptonization of the coagulation. | | |
| (5) Splitting of arbutin | positive | | | |
| (6) Starch-like compound | slightly produced or faintly produced | not produced | | |
| (7) L-Lysine utilization | utilized as carbon and nitrogen sources | | | |
| (8) L.Aminolactam utilization. | utilized as carbon and nitrogen sources | | | |
| (9) Growth conditions | good growth at 30° C  good growth at pH 6.0 | | | |
| IV. Source | | isolated from soil | | |

It is satisfactory to consider the three strains of FERM-P 715, 717, 719 as *Candida* and more particularly *Candida humicola* on the basis of the description in J. Lodder and N. J. W. Kreger — Van Rij's "The Yeasts, A Taxonomic Study" (1967) and the close resemblance to *Candida humicola* IFO 0753.

In Table 3, characteristics of the FERM-P 712, 714, 725 and *Trichosporon cutaneum* IFO 0173 are presented.

TABLE 3

| Specific name | Trichosporon cutaneum IFO 0173 | FERM-P714, Trichosporon cutaneum Toray 2007 | FERM-P725, Trichosporon cutaneum Toray 2035 | FERM-P712, Trichosporon cutaneum Toray 2004 |
|---|---|---|---|---|
| I. Microscopic observations (1) Cells in YM broth 1. Shape | variable shape: round, oval, long oval, cylindrical, occasionally giant cells | | | |
| 2. Dominant cells | round to oval, (6–8) × (8–10) μ | | long oval, (4–5) × (7–10) μ | cylindrical, (7–8) × (20–30) μ |
| 3. Vegetative reproduction | multilateral budding and fission | | | mainly fission |
| (2) Slide culture and potato-agar | cells present. rich development of true mycelium. no pseudomycelium. blastospores round to oval forming clusters. arthrospores in typical zigzag form. | | | |
| (3) Ascospore formation | not observed on gypsum block or a modified Gorodkowa-agar in 30 days incubation. | | | |
| II. Cultural characteristics (1) YM broth 1. Turbidity | not turbid | | | |

TABLE 3.—Continued

| Specific name | Trichosporon cutaneum IFO 0173 | FERM-P714, Trichosporon cutaneum Toray 2007 | FERM-P725, Trichosporon cutaneum Toray 2035 | FERM-P712, Trichosporon cutaneum Toray 2004 |
|---|---|---|---|---|
| 2. Sediment | compact | flocculent | | compact |
| 3. Pellicle | pellicle formed, later going down as sediment | | | |
| (2) YM-agar colonies 1. Shape | circular, becoming filamentous | | | |
| 2. Margin | filamentous | entire, becoming filamentous | | filamentous |
| 3. Elevation | raised | convex | convex, later umbilicate | raised |
| 4. Surface | rough dull | smooth, becoming rough, dull | smooth, becoming velvet-like folded, lusterless | wrinkled lusterless |
| 5. Quality | butyrous to dry | butyrous | dry | |
| 6. Color | cream-colored | | | cream to whitish cream-colored |
| (3) YM slant culture 1. Growth | abundant | moderate | abundant | |
| 2. Margin | filamentous | undulate, becoming filamentous on the upper part | undulate to filamentous | |
| 3. Surface (30 days culture) | velvet-like folded | rough | velvet-like folded | wrinkled |
| III. Physiological characteristics (1) Sugar fermentation | no gas produced from glucose, galactose, sucrose, maltose, lactose, raffinose in 30 days incubation | | | |
| (2) Sugar assimilation (auxanographic method) | glucose, galactose, sucrose, maltose, lactose are assimilated | | | |
| (3) KNO₃ assimilation | absent (both on liquid culture and auxanographic methods) | | | |
| (4) Litmus milk 1. Color | unchanged, after 25 days reduced | | | |
| 2. Coagulation | coagulated after 25 days | | | |
| 3. Peptonization | no | slow pepitonization of the coagulation | no | |
| (5) Splitting of arbutin | negative | positive | negative | |
| (6) Starch-like compound | not produced | | | |
| (7) L-Lysine utilization | utilized as carbon and nitrogen sources | | | |
| (8) L-Aminolactam utilization | utilized as carbon and nitrogen sources | | | |
| (9) Growth conditions | good growth at 30° C good growth at pH 6.0 | | | |
| IV. Source | isolated from soil | | | |

It is satisfactory to consider the three strains of FERM-P 712, 714, 725 as *Trichosporon* and more particularly *Trichosporon cutaneum* on the basis of the description in J. Lodder and N. J. W. Kreger — Van Rij's "The Yeasts, A Toxonomic Study" (1967) and the close resemblance to *Trichosporon cutaneum* IFO 0173.

As for the composition of the culture medium, either a synthetic or a natural culture medium is suitable so long as it contains the essential nutrients for the growth of the yeast strain employed, and a small amount of L- or DL-amino-lactam as the inducer for the enzyme. For instance, the medium employed in the examples of this invention consist of 1% glucose, 0.3% NH₄NO₃, 5% L-amino-lactam hydrochloride, 0.1% KH₂PO₄, 0.05% MgSO₄·7H₂O, 0.02% MnCl₂·5H₂O and 0.05 percent yeast extract (pH 6).

Cultures are carried out aerobically at 20°–40° C, preferably 30° C.

As for the state of the L-amino-lactam hydrolyzing agent when applied in the process of this invention, growing cells, a culture broth, living cells, modified cells such as lyophilized cells and acetone-dried cells, a cell extract, and a purified protein derived from cells, namely "L-amino-lactam amidohydrolase" are effectively used. Moreover, the enzyme can be also used in the state of an "insolubilized enzyme" such as DEAE-, TEAE-, GE-cellulose-adsorbed enzyme and DEAE-sephadex-adsorbed enzyme. Furthermore, as for the L-amino-lactam hydrolyzing agent, the L-amino-lactam amidohydrolase the characteristics of which are described in the next paragraph is specified. Therefore, microorganisms other than *Cryptococcus*, *Candida* and *Trichosporon* are also employed as producers of the L-amino-lactam hydrolyzing agent so far as they produce the same L-amino-lactam amidohydrolase as specified in the present invention.

The characteristics of the L-amino-lactam amidohydrolase are as follows:

1. Catalytic action: — hydrolyze L-amino-lactam, producing L-lysine.
2. Substrate specificity:
   1. may hydrolyze D-amino-lactam at a rate of 0.1 –0.5 percent or so of the activity on L-amino-lactam.
   2. not hydrolyze α-butyrolactam, δ-valerolactam, ε-caprolactam, cyclic dimer, trimer and pentamer of ε-aminocaproic acid, D and L-pyrrolidon carboxylic acid.
3. Active range of pH: — active at pH 6 – 12, being optimum at about pH 9.0
4. Assay method: — incubated with L-amino-lactam solution of a pH 9.0. The amount of L-lysine produced in the incubated mixture is analyzed.
5. Optimum temperature: — 70° C for an incubation of about 20 minutes. 40°– 50° C for an incubation of several hours.
6. Inhibitor: — Ethylenediaminetetraacetic acid (EDTA)
7. Activator: — $Mn^{++}$, $Mg^{++}$, $Zn^{++}$, $Co^{++}$
8. Purification: — Fractionation with ammonium sulfate. Fraction of about 30 – 40 percent saturation. Then, liquid chromatography using DEAE - cellulose.

In connection with the reaction step of this invention, more preferred embodiments are as follows:

The reaction mixture is composed of a proper amount of a L-amino-lactam hydrolyzing agent and an aqueous solution of L-amino-lactam or L-amino-lactam containing substance such as DL-amino-lactam, pH of 6 – 12, preferably 9. As for the concentration of amino-lactam in an aqueous solution used above, 5 –20 wt percent is preferred.

L-amino-lactam hydrolyzing agent is used preferably in an amount of 0.1 – 10 wt percent based upon dry amino-lactam. Incubation is carried out at a temperature from about room temperature to about 75° C, for the usualy time, preferably with gentle stirring.

When insolubiliized enzyme is employed, the insolubilized enzyme is preferably used in the form of a column.

After completion of the reaction, the L-lysine product is recovered from the reaction mixture by any one of a number of different procedures which are convenient for such purposes, and which are well known to those skilled in the art.

For instance, a reaction mixture is centrifuged and a supernatant liquid is obtained. The pH of the supernatant liquid is adjusted to 4.1 by adding an aqueous solution of HCl. A small amount of activated charcoal is then added to the supernatant liquid. The mixture is boiled for a few minutes, cooled to about room temperature and filtered.

The filtrate is dried and a residue is obtianed.

The residue may be composed principally of lysine mono-hydrochloride or a mixture of lysine monohydrochloride and amino-lactam hydrochloride.

The residue is suspended in a small volume of methyl alcohol. The suspension is stirred for several hours at room temperature. Aminolactam hydrochloride, if present, is dissolved into methyl alcohol, but lysine monohydrochloride remains. Crystals of lysine monohydrochloride are obtained from the suspension by filtration.

In order to obtain aminolactam, the following operation is employed. The filtrate is mixed with a dilute aqueous solution of HCl and the pH of the filtrate is brought down to about 1.

The solution is dried and the residue is principally composed of aminolactam monohydrochloride and a trace amount of lysine dihydrochloride.

The residue is suspended in a small volume of ethyl alcohol. The suspension is stirred for several hours at room temperature.

Lysine dihydrochloride is dissolved in ethyl alcohol, but aminolactam hydrochloride remains.

Crystals of aminolactam hydrochloride are obtained from the suspension by filtration.

This invention is further illustrated by the following examples.

EXAMPLE 1

Two ml of the culture medium, the composition of which was heretofore described in this specification, were placed in a test tube and sterilized. Each yeast strain shown in Table 4 was inoculated to the medium and cultured with aerobic shaking at 30°C for 48 hours.

At the end of the culturing period, L-lysine was found to be produced in each culture broth as shown in Table 4.

TABLE 4

| Strains | | | L-lysine μmoles/ml |
|---|---|---|---|
| *Cryptococcus laurentii* | TORAY 2001, | FERM-P 709 | 254 |
| *Cryptococcus laurentii* | TORAY 2002, | FERM-P 710 | 234 |
| *Trichosporon cutaneum* | TORAY 2004, | FERM-P 712 | 32 |
| *Trichosporon cutaneum* | TORAY 2007, | FERM-P 714 | 272 |
| *Candida humicola* | TORAY 2008, | FERM-P 715 | 136 |
| *Candida humicola* | TORAY 2010, | FERM-P 717 | 128 |
| *Candida humicola* | TORAY 2020, | FERM-P 719 | 264 |
| *Trichosporon cutaneum* | TORAY 2035, | FERM-P 725 | 182 |
| *Candida humicola* | IFO 0735, | ATCC 9949 | 151 |
| *Candida humicola* | IFO 0760 | | 103 |
| *Trichosporon cutaneum* | IFO 0173 | | 54 |
| *Trichosporon cutaneum* | IFO 1198 | | 188 |
| *Cryptococcus laurentii* | IFO 0609 | | 243 |
| *Cryptococcus laurentii* | IFO 0906 | | 251 |

EXAMPLE 2

Two hundred ml of the culture medium, the composition of which was heretofore described in this specification, were placed in a 1-L-flask and sterilized. Each yeast strain shown in Table 5 was inoculated to the medium and cultured with aerobic shaking at 30° for 20 hours. Cells were collected by centrifugation from the culture broth and dried with acetone.

The reaction mixture was composed of 10 mg/ml of the acetone-dried cells and 5 percent DL-, L- or D-aminolactam aqueous solution adjusted with HCl to pH 9.

Incubation was carried out at 50° C for 2 hours.

As a result, it was found that L-aminolactam was converted to L-lysine, and D-aminolactam was not substantially hydrolyzed.

In Table 5, the concentration, expressed in μmoles/ml, of lysine produced and aminolactam remaining are shown.

aminolactam aqueous solution adjusted with HCl to pH 9.

Incubation was carried out at 50° C for 4 hours with gentle stirring.

From the reaction mixture 6.2 g of L-lysine monohydrochloride (yield: 43.5 percent, optical purity: 98.2

TABLE 5

| Strains | DL-aminolactam | | L-aminolactam | | D-aminolactam | |
|---|---|---|---|---|---|---|
| | Lysine produced | Aminolactam remaining | Lysine produced | Aminolactam remaining | Lysine produced | Aminolactam remaining |
| Cryptococcus laurentii TORAY 2001 | 131 | 244 | 140 | 235 | 0.4 | 390 |
| Cryptococcus laurentii TORAY 2002 | 190 | 186 | 202 | 177 | .6 | 388 |
| Trichosporon cutaneum TORAY 2004 | 38 | 350 | 40 | 344 | .6 | 388 |
| Trichosporon cutaneum TORAY 2007 | 192 | 185 | 340 | 35 | 1.8 | 387 |
| Candida humicola TORAY 2008 | 84 | 302 | 100 | 281 | .4 | 391 |
| Candida humicola TORAY 2010 | 69 | 322 | 81 | 299 | .4 | 392 |
| Candida humicola TORAY 2020 | 193 | 187 | 280 | 102 | 1.8 | 386 |
| Trichosporon cutaneum TORAY 2035 | 98 | 291 | 102 | 280 | .4 | 390 |
| Candida humicola IFO 0735 | 97 | 290 | 105 | 277 | .2 | 390 |
| Candida humicola IFO 0760 | 52 | 333 | 55 | 338 | .3 | 389 |
| Trichosporon cutaneum IFO 0173 | 23 | 361 | 29 | 360 | .7 | 387 |
| Trichosporon cutaneum IFO 1198 | 110 | 275 | 110 | 280 | .7 | 387 |
| Cryptococcus laurentii IFO 0609 | 191 | 188 | 385 | 0 | .4 | 390 |
| Cryptococcus laurentii IFO 0906 | 190 | 175 | 387 | 0 | .4 | 390 |
| Not inoculated | 0 | 390 | 0 | 390 | | 390 |

EXAMPLE 3

*Cryptococcus laurentii* TORAY 2001 FERM-P 709 was cultured in the medium the composition of which was heretofore described in this specification at 30° C for 20 hours. Cells were harvested and dried with acetone.

The reaction mixture was composed of 1g of the acetone dried cells and 100 ml of a 10 percent DL-aminolactam aqueous solution adjusted with HCl to pH 9.

Incubation was carried out at 50° C for 20 hours with gentle stirring.

From the reaction mixture 6.4 g of L-lysine monohydrochloride and 5.4 g of D-aminolactam hydrochloride were obtained.

The yield of L-lysine obtained from DL-aminolactam was 45 percent. The optical purity of the L-lysine obtained was 100 percent.

The yield of D-aminolactam from DL-aminolactam was 42 percent. The optical purity of the D-aminolactam was 98.5 percent.

EXAMPLE 4

Acetone-dried cells of *Cryptococcus laurentii* TORAY 2002, FERM-P 710 were prepared in the same manner as in Example 3.

The following operations were carried out in much the same way as in Example 3, except that the acetone-dried cells prepared here were used.

From the reaction mixture 6.7 g of L-lysine monohydrochloride (yield: 47 percent, optical purity: 98.2 percent) and 5.1 g of D-aminolactam hydrochloride (yield: 40 percent, optical purity: 98.2 percent) were obtained.

EXAMPLE 5

Acetone-dried cells of *Candida humicola* TORAY 2020, FERM-P 719 were prepared in the same manner as in Example 3.

The reaction mixture was composed of 1g of the acetone-dried cells and 200 ml of a 5 percent DL-aminolactam aqueous solution adjusted with HCl to pH 9.

percent) and 5.3 g of D-aminolactam hydrochloride (yield: 41 percent, optical purity: 97.8 percent) were obtained.

EXAMPLE 6

*Cryptococcus laurentii* TORAY 2001, FERM-P 709 was cultured in a medium the composition of which was heretofore described in this specification at 30° C for 20 hours. The cells were harvested and lyophilized.

The reaction mixture was composed of 1 g of the lyophilized cells and 100 ml of a 10 percent DL-aminolactam aqueous solution adjusted with HCl to pH 9. Incubation was carried out at 50° C for 20 hours with gentle stirring.

From the reaction mixture 6.0 g of L-lysine monohydrochloride (yield: 42 percent, optical purity 99.4 percent)and 5.8 g of D-aminolactam hydrochloride (yield: 45 percent, optical purity: 99.0 percent) were obtained.

EXAMPLE 7

*Cryptococcus laurentii* TORAY 2002, FERM-P was cultured in a medium the composition of which was heretofore described in this specification at 30° C for 20 hours. The cells were harvested and suspended in water.

The reaction mixture was composed of 50 ml of the intact cell suspension (1 g of dry weight) and 50 ml of 20 percent DL-aminolactam aqueous solution adjusted with HCl to pH 9. Incubation was carried out at 40° C for 20 hours.

From the reaction mixture 4.6 g of L-lysine monohydrochloride (yield: 32 percent, optical purity: 99.2 percent) and 5.8 g of D-aminolactam hydrochloride (yield: 45 percent, optical purity 97.6 percent) were obtained.

EXAMPLE 8

*Cryptococcus laurentii* TORAY 2001, FERM-P 709 was cultured in a medium the composition of which was heretofore described in this specification at 30° C for 20 hours. The cells were harvested and were destroyed with a French-press. The cell extract was obtained by centrifugation and dialyzed against $10^{-2}$M phosphate buffer (pH 7.5).

The reaction mixture was composed of 20 ml of the cell extract (corresponding to 2 g of dried cells), 50 ml of 20 percent DL-aminolactam aqueous solution and 30 ml of water. The pH of the reaction mixture was adjusted to 9 with HCl.

Incubation was carried out at 40° C for 30 hours.

From the reaction mixture 6.1 g of L-lysine monohydrochloride (yield: 43 percent, optical purity: 99.0 percent) and 5.3 g of D-aminolactam hydrochloride (yield: 41 percent, optical purity: 100 percent) were obtained.

EXAMPLE 9

Fifty ml of cell extract which was dialyzed against $10^{-2}$M phosphate buffer was prepared from 25 g of living cells of *Cryptococcus laurentii* TORAY 2001, FERM-P 709 in the same manner as in Example 8.

The cell extract was fractionated with ammonium sulfate and a fraction of 30 — 40 percent saturation was obtained. This fraction was dialyzed against $10^{-3}$M phosphate buffer and lyophilized and 21 mg of crude enzyme was obtained. The L-aminolactam hydrolyzing activity of this crude enzyme was 700 μmoles/hr/mg.

The reaction mixture was composed of 10 mg of the crude enzyme and 50 ml of 10 percent DL-aminolactam aqueous solution adjusted with HCl to pH 9.

Incubation was carried out at 43° C for 20 hours.

From the reaction mixture 3.0 g of L-lysine monohydrochloride (yield: 43 percent, optical purity 99.6 percent) and 5.9 g of D-aminolactam hydrochloride (yield 46 percent, optical purity 99 percent) were obtained.

EXAMPLE 10

Ten mg of the crude enzyme prepared in Example 9 was dissolved in 5 ml of $5 \times 10^{-3}$M phosphate buffer (pH 7.6). One g of DEAE-cellulose (OH type) was bufferized with the same buffer. Both preparations were mixed, stirred for 30 minutes, and filtered. Thus, an enzyme adsorbed on DEAE-cellulose was obtained. A column, 1 cm $\phi \times 20$ cm, was made of the enzyme-adsorbing DEAE-cellulose.

Six hundred ml of 1 percent DL-aminolactam aqueous solution (the pH was not adjusted) was allowed to flow through the column which was kept at 43° C for 20 hours.

From the effluent 4.0 g of L-lysine monohydrochloride (yield: 47 percent, optical purity 100 percent) and 3.8 g of D-aminolactam hydrochloride (yield: 49 percent, optical purity 98.5 percent) were obtained.

I claim:

1. A process for preparing L-lysine which comprises contacting an α-amino-ε-caprolactam selected from the group consisting of L- and DL-α-amino-ε-caprolactam in an aqueous solution with a microorganism having L-aminolactam-hydrolyzing activity selected from the group consisting of the genera *Cryptococcus*, *Candida* and *Trichosporon* wherein said aminocaprolactam is subjected to asymmetrical hydrolysis by the catalytic action of said microorganism.

2. A process for preparing L-lysine which comprises contacting an α-amino-ε-caprolactam selected from the group consisting of L- and DL-α-amino-ε-caprolactam in an aqueous solution with the enzyme, L-aminolactam amido-hydrolase isolated from cells of a microorganism having L-aminolactam-hydrolyzing activity selected from the genera *Cryptococcus*, *Candida*, and *Trichosporon*, said aminocaprolactam undergoing asymmetrical hydrolysis in contact with said enzyme.

3. A process for preparing L-lysine which comprises subjecting α-amino-ε-caprolactam in an aqueous solution to the action of a member having L-aminolactam-hydrolyzing activity selected from the group consisting of growing culture, a culture broth, living cells, dried cells, and a cell extract of a microorganism selected from the genera *Cryptococcus*, *Candida* and *Trichosporon*, said aminocaprolactam undergoing asymmetrical hydrolysis in contact with said group member.

4. The process according to claim 1 wherein L-lysine so produced in the reaction mixture is then isolated in a conventional manner.

* * * * *